United States Patent
Danø et al.

(10) Patent No.: US 9,029,039 B2
(45) Date of Patent: May 12, 2015

(54) FUEL CELL STACK WITH COMBINED FLOW PATTERNS IN A FUEL CELL STACK OR AN ELECTROLYSIS CELL STACK

(75) Inventors: Sune Danø, Bagsværd (DK); Mads Find Madsen, Brønshøj (DK); Jens Ulrik Nielsen, Søborg (DK); Harald Usterud, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 545 days.

(21) Appl. No.: 13/380,348

(22) PCT Filed: Jul. 1, 2010

(86) PCT No.: PCT/EP2010/003867
§ 371 (c)(1),
(2), (4) Date: Dec. 22, 2011

(87) PCT Pub. No.: WO2011/003519
PCT Pub. Date: Jan. 13, 2011

(65) Prior Publication Data
US 2012/0094204 A1  Apr. 19, 2012

Related U.S. Application Data

(60) Provisional application No. 61/223,297, filed on Jul. 6, 2009.

(30) Foreign Application Priority Data

Jul. 6, 2009 (DK) .................................. 2009 00825

(51) Int. Cl.
*H01M 2/38* (2006.01)
*H01M 8/04* (2006.01)
*H01M 8/24* (2006.01)
*C25B 9/18* (2006.01)

(52) U.S. Cl.
CPC ...... *H01M 8/04007* (2013.01); *H01M 8/04067* (2013.01); *H01M 8/04097* (2013.01); *H01M 8/2425* (2013.01); *H01M 8/2465* (2013.01); *Y02E 60/50* (2013.01); *C25B 9/18* (2013.01)

(58) Field of Classification Search
CPC ..................... H01M 8/04007; H01M 8/04067; H01M 8/04097; H01M 8/2465; H01M 8/2425; C25B 9/18; Y02E 60/523; Y02E 60/50
USPC .......................................... 429/457; 204/270
See application file for complete search history.

(56) References Cited

U.S. PATENT DOCUMENTS 6,083,636 A * 7/2000 Hsu ............................. 429/434
6,296,962 B1 10/2001 Minh
7,459,231 B2 12/2008 Wariishi et al.
(Continued)

FOREIGN PATENT DOCUMENTS

WO  WO 01/29923 A1  4/2001
WO  WO 2006/014155 A1  2/2006
WO  WO 2008/094550 A1  8/2008

*Primary Examiner* — Gary Harris
(74) *Attorney, Agent, or Firm* — Dickstein Shapiro LLP

(57) ABSTRACT

A cell stack comprising a plurality of fuel cells or electrolysis cells has a combination of flow patterns between anode gas and cathode gas internally in each of the cells and between the cells relative to each other such that cathode and anode gas internally in a cell flows in either co-flow, counter-flow or cross-flow and further that anode and cathode gas flow in one cell has co-flow, counter-flow or cross-flow relative to the anode and cathode gas flow in adjacent cells.

6 Claims, 13 Drawing Sheets

(56) References Cited

U.S. PATENT DOCUMENTS

| | | |
|---|---|---|
| 2002/0106548 A1 | 8/2002 | Chung et al. |
| 2003/0235734 A1 | 12/2003 | Haltiner, Jr. et al. |
| 2005/0233181 A1* | 10/2005 | Wariishi et al. .......... 429/12 |
| 2006/0127709 A1 | 6/2006 | Bai et al. |
| 2007/0207363 A1 | 9/2007 | Chyou et al. |
| 2008/0248349 A1 | 10/2008 | McElroy et al. |

* cited by examiner

Fig. 1 "Co"
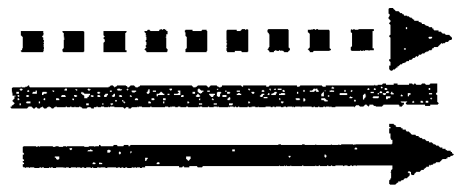
Fig. 2 "Cou"
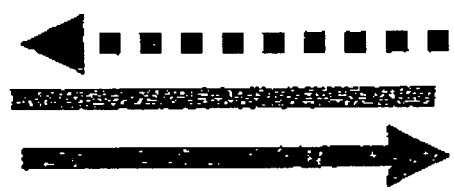
Fig. 3 "A"
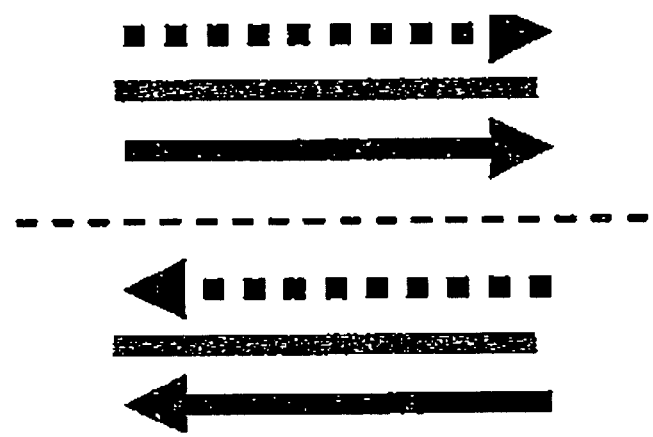

Fig. 4 "B"
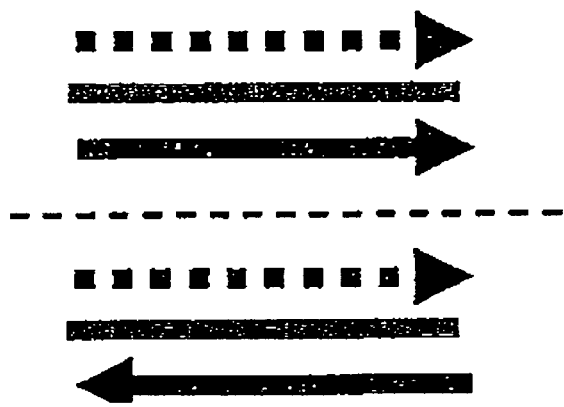
Fig. 5 "C"
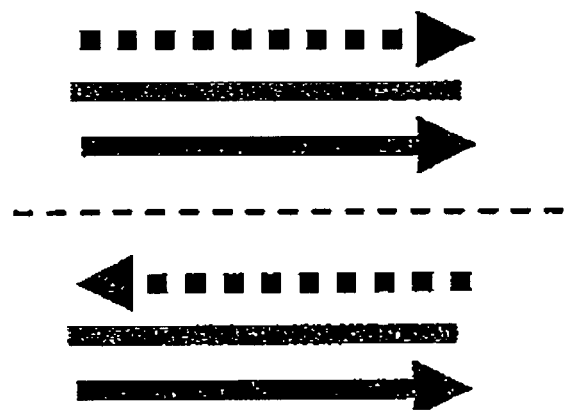
Fig. 6 "D"
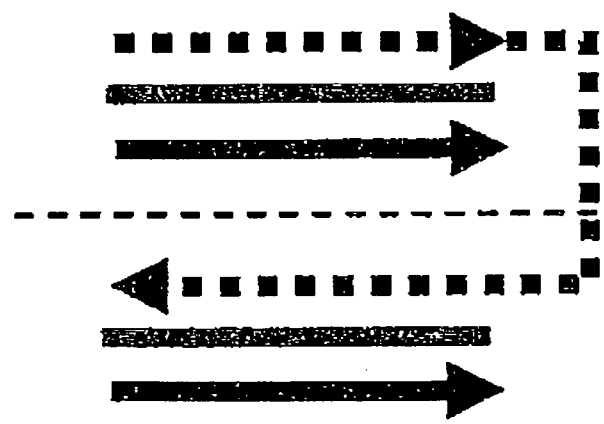

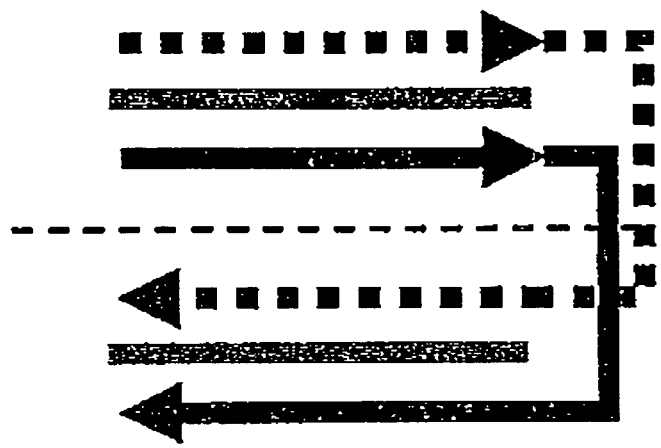
Fig. 7 "E"
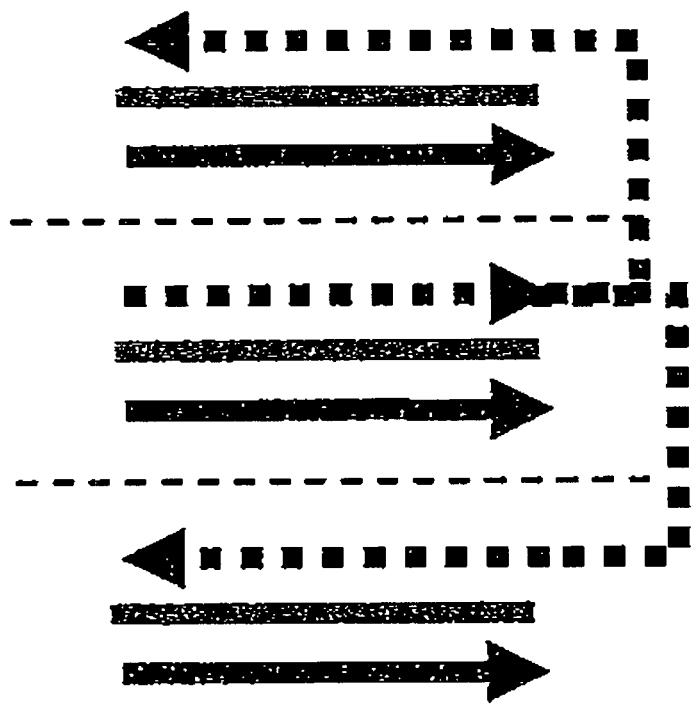
Fig. 8 "F"

Fig. 9 "G"
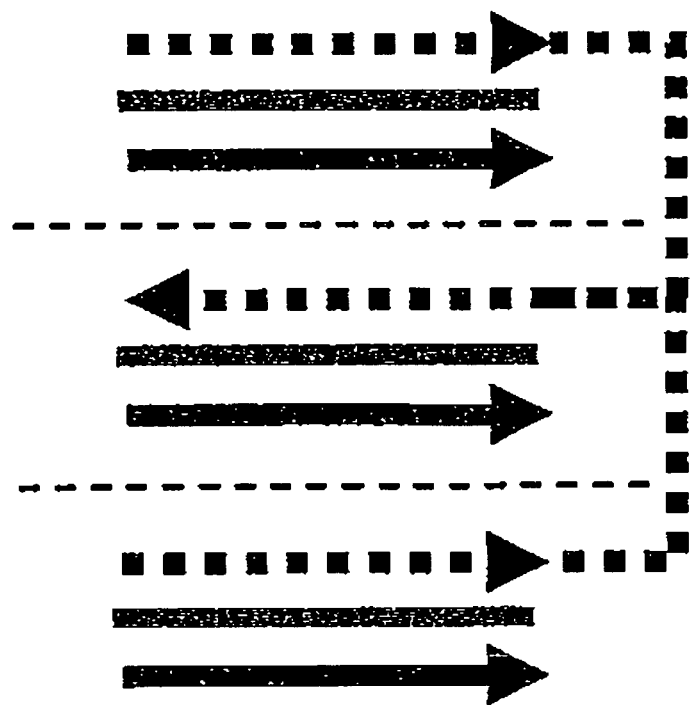
Fig. 10 "H"
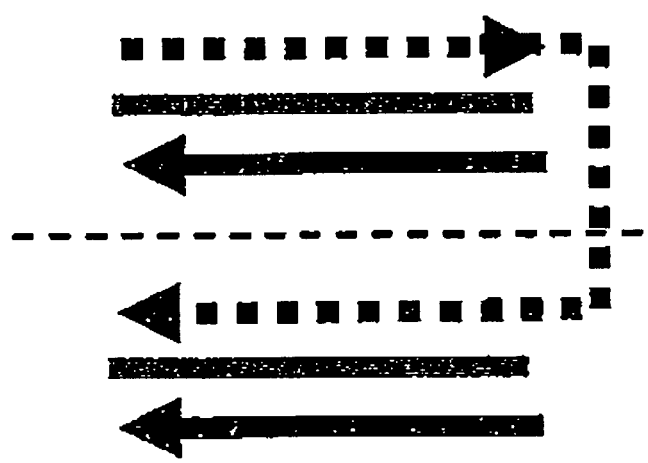

Fig. 11 "I"
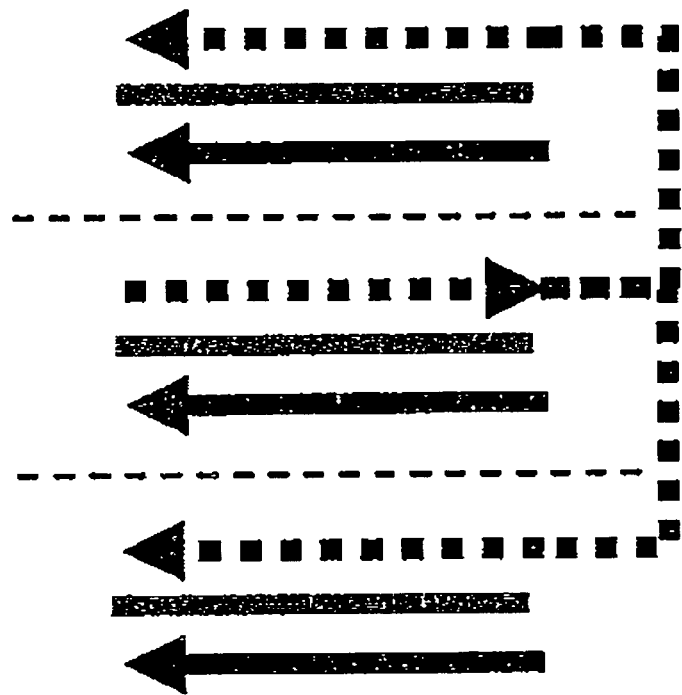
Fig. 12 "J"
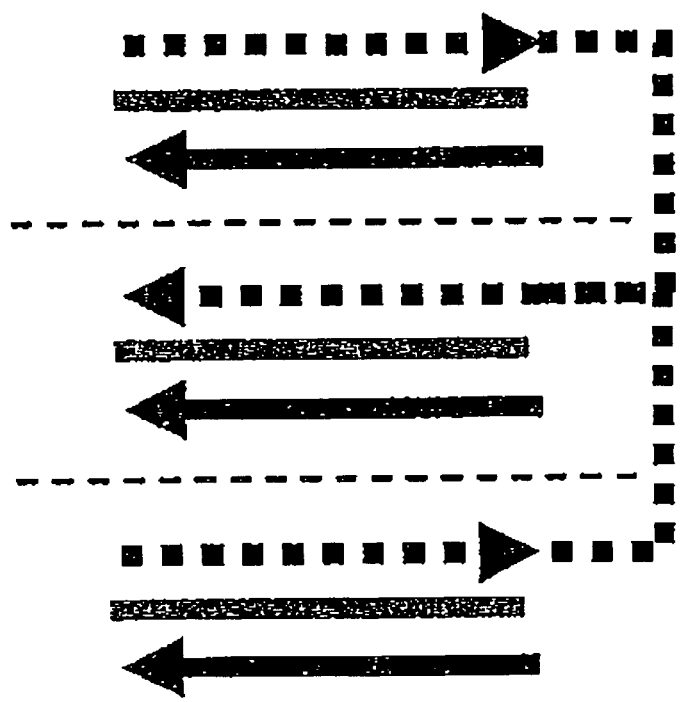

ASR ng / (mΩ cm$^2$)

ASR H2/ (mΩ cm$^2$)

T H_ng / K

Cathode Gas Flow Direction →

I H_ng

Cathode Gas Flow Direction →

FUEL CELL STACK WITH COMBINED FLOW PATTERNS IN A FUEL CELL STACK OR AN ELECTROLYSIS CELL STACK

This application claims the benefit of U.S. Provisional Application No. 61/223,297, filed on Jul. 6, 2009.

The present invention concerns Cell stacks in particular Solid Oxide Fuel Cell (SOFC) stacks or Solid Oxide Electrolysis Cell (SOEC) stacks where the flow direction of the cathode gas relative to the anode gas internally in each cell as well as the flow directions of the gases between adjacent cells, are combined through different cell layers of the stack. Further the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

In the following, the invention is explained in relation to SOFC. Accordingly, in the SOFC the cathode gas is an oxidation gas and the anode gas is a fuel gas. The invention can, however, also be used for other types of cells such as SOEC as already mentioned or even Polymer Electrolyte fuel cells (PEM) or Direct Methanol Fuel Cells (DMFC).

An SOFC comprises an oxygen-ion conducting electrolyte, a cathode where oxygen is reduced and an anode where hydrogen is oxidised. The overall reaction in an SOFC is that hydrogen and oxygen react electrochemically to produce electricity, heat and water. The operating temperature for an SOFC is in the range of 650 to 1000° C., preferably 750 to 850° C. AN SOFC delivers in normal operation a voltage of approximately 0.8V. To increase the total voltage output, the fuel cells are assembled in stacks in which the fuel cells are electrically connected via interconnector plates.

In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

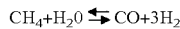
$CH_4 + H_2O \rightleftharpoons CO + 3H_2$

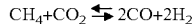
$CH_4 + CO_2 \rightleftharpoons 2CO + 2H_2$

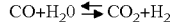
$CO + H_2O \rightleftharpoons CO_2 + H_2$

During operation, an oxidant such as air is supplied to the solid oxide fuel cell in the cathode region. Fuel such as hydrogen is supplied in the anode region of the fuel cell. Alternatively a hydrocarbon fuel such as methane is supplied in the anode region where it is converted into hydrogen and carbon oxides by the above reactions. Hydrogen passes through the porous anode and reacts at the anode/electrolyte interface with oxygen ions generated on the cathode side and conducted through the electrolyte. Oxygen ions are created in the cathode side as a result of the acceptance of electrons from the external circuit of the cell.

Interconnects serve to separate the anode and fuel sides of adjacent cell units and at the same time enable current conduction between anode and cathode. Interconnects are normally provided with a plurality of channels for the passage of fuel gas on one side of the interconnect and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit. Thus, internally a cell can have co-flow if the fuel gas flow direction is substantially the same as the cathode gas flow direction, or cross-flow if the fuel gas flow direction is substantially perpendicular to the cathode gas flow direction, or counter-flow if the fuel gas flow direction is substantially opposite to the cathode gas flow direction.

Conventionally, the cells are stacked one on top of each other with a complete overlap resulting in a stack with for instance co-flow having all fuel and oxidant inlets on one side of the stack and all fuel and oxidant outlets on the opposite side. Due to the exothermicity of the electrochemical process, the outlet gases leave at higher temperature than the inlet temperature. When combined in an SOFC stack operating at for instance 750° C. a significant temperature gradient across the stack is generated. Though to some extent necessary for the cooling of the stack, since the air cooling is proportional to the temperature gradient, large thermal gradients induce thermal stresses in the stack which are highly undesirable and they entail difference in current density and electrical resistance. Therefore the problem of thermal management of an SOFC stack exists: to reduce thermal gradients enough to avoid unacceptable stresses, but have sufficiently large thermal gradients—outlet gas temperature difference as compared to inlet gas temperature to be able to cool the stack with said gasses.

U.S. Pat. No. 6,830,844 describes a system for thermal management in a fuel cell assembly, particularly for preventing temperature gradients of above 200° C. across the cathodes by periodically reversing the air flow direction across the cathode, thereby alternating the supply and exhaust edges of the cathodes.

U.S. Pat. No. 6,803,136 describes a fuel cell stack with a partial overlap between the cells comprising the stack resulting in an overall spiral configuration of the cells. The cells are angularly offset to one another which provides ease of manifolding and thermal management.

It is an object of the present invention to provide a fuel cell stack, particularly a solid oxide fuel cell stack with improved thermal management across the stack.

It is a further object of the present invention to provide a solid oxide fuel cell stack which has a reduced electrical resistance as compared to state of the art SOFC stacks.

Yet a further object of the present invention is to provide an SOFC stack which has a larger power output over a larger part of each cell in the stack as compared to conventional SOFC.

A further object of the invention is to provide an SOFC stack with a higher maximum fuel utilization coefficient as compared to conventional SOFC stacks achieved by means of redistributing the fuel flow after a primary fuel cell flow pass to a secondary fuel cell flow pass with or without a split or a merge of the fuel gas.

These and other objects are solved by the invention.

We have found that the spiral stack system of U.S. Pat. No. 6,803,136 is not very effective in reducing temperature gradients across the stack, apparently because each cell in the stack is only slightly rotated with respect to the adjacent cells.

Accordingly, we provide a solid oxide fuel cell stack comprising a plurality of planar cells arranged in layers on top of each other in planes parallel to each other, in which each cell unit comprises an anode, electrolyte and cathode and where the anode and cathode of adjacent cells are separated from each other by an interconnect provided with inlet portions and outlet portions for the passage of fuel gas and oxidant gas to each cell, wherein a combination of co-flow and counter-flow patterns of the fuel and oxidant gas internally in each cell and between adjacent cells is provided and the fuel and cathode gas can flow either through only a primary fuel cell before it is exhausted from the stack or it can flow through a primary cell and then further through a secondary cell before it is exhausted; when passing from one or more primary cells the fuel and cathode gas can either be merged from a plurality of flow streams to a single stream or split from one to a plurality of flow streams before continuing to one or more secondary cells in the stack.

In this context "combination" is to be understood such that each cell in the stack internally can have any of the patterns co-flow, counter-flow or cross-flow and that each cell in the stack can be arranged in alternating order relative to its adjacent cells such that adjacent cells experience co-flow, counter-flow or cross-flow relative to its adjacent cells. Hence, according to the present invention, all cells in a stack can for instance internally have co-flow between fuel and cathode gas, whereas each adjacent cell in said stack is arranged in alternating order such that a cell experience counter-flow relative to its adjacent cells.

Accordingly, the present invention provides a wide range of flow patterns in an SOFC stack. As a result an improved thermal management across the stack is obtained.

The combination of flow patterns internally in each cell and between adjacent cells as well as the combination of single and plural gas flow passes between one or more cells plus the combination of split and merge of gas flow streams according to the present invention provide the possibility of obtaining an advantageous temperature profile and current output profile across the individual cell and across the complete stack. Thus, a low area specific resistance (ASR) is obtained since current is extracted from a large and relatively hot area, and simultaneously effective cooling with cathode gas is obtained by ensuring a high cathode gas outlet temperature. Some combined flow patterns in addition give an improved maximum fuel utilization coefficient by mixing the fuel gas flow internally in the stack, CMR or alternatively by distributing variations in the pressure drop of each individual cell to two or more cells which are serially connected on the fuel gas side.

Co-flow, cross-flow or counter-flow internally in fuel cell stacks as known in state of the art, each has different characteristics and advantages. Cross-flow has less current density at a given maximum stack temperature than both co-flow and counter-flow, primarily since co-flow and counter-flow distributes temperature and current output across the cells better. When comparing counter-flow and co-flow, they each have their advantages. A counter-flow stack to a higher extent than the co-flow stack has its current output where it is relative hot which means relatively low internal resistance (ASR— Area Specific Resistance), while a co-flow stack has a higher cathode gas outlet temperature compared to the cathode gas inlet temperature ($\Delta T$) and thus has the most effective cooling, but has to a higher extent the current output where it is relatively cold, meaning larger ASR.

According to the present invention as explained, the different advantages can be combined by combining the flow patterns in general throughout the stack and internally in the cells in the stack. Further the discussed merge or split of gas flow streams as well as more than one cell pass of the gas flow streams provide an additional profit of higher fuel utilization coefficient. Accordingly, three primary advantages of the present invention can be defined:

Advantage 1: Reduced electrical resistance internally in the cells by means of current output from a larger part of the cell, especially in the hotter zones (lower electrical resistance in the ceramic conductor and lower polarisation resistance at the electrodes).

Advantage 2: High cathode outlet gas temperature compared to the cathode inlet gas temperature, $\Delta T$ which gives an improved cooling when the stack is cooled by the cathode gas.

Advantage 3: Higher maximum fuel utilization coefficient by means of redistribution of the fuel to more than one fuel cell flow pass, possibly including split or merge of the flow streams between a primary and a secondary flow pass.

These advantages have conventionally related each to one of the set-ups: counter-flow, co-flow and serially connected stacks. But the present invention provides a solution whereby all three advantages can be combined, and the advantage of counter-flow can be improved even beyond the state of the art.

As explained, the present invention provides for any combination of gas flow stream merge, split and number of cell passes as well as any combination of gas flow direction pattern (co-flow, cross-flow and counter-flow) internally in each cell as well as between adjacent cells in a stack. In the following a range of embodiments according to the invention are described in examples and their advantages are analyzed.

1. A cell stack comprising a plurality of fuel cells or electrolysis cells arranged in layers on top of each other, each of said cells comprising an anode an electrolyte and a cathode, each layer of cells is divided by a plurality of interconnects, one between each cell, the interconnects are provided with gas channels on each side facing the anode or cathode side of the adjacent cell, the gas channels run from an inlet portion to an outlet portion of said cells, the substantial direction from the anode inlet portion to the anode outlet portion of the anode side of each cell defines the anode gas flow direction of each cell and the substantial direction from the cathode inlet portion to the cathode outlet portion of the cathode side of each cell defines the cathode gas flow direction of each cell, each cell in the stack has one of:
  internal co-flow of the anode gas flow direction relative to the cathode gas flow direction or,
  internal cross-flow of the anode gas flow direction relative to the cathode gas flow direction or,
  internal counter-flow of the anode gas flow direction relative to the cathode gas flow direction
the interfacing sides of adjacent cells on each side of an interconnect are oriented in either of:
  interconnect co-flow
  interconnect cross-flow
  interconnect counter-flow,
wherein the stacked cells are arranged such that each individual cell and adjacent cells have a combination of said internal co-flow, internal cross-flow or internal counter-flow of the anode gas direction relative to the cathode gas flow direction internally in each individual cell and have a combination of said interconnect co-flow, interconnect cross-flow or interconnect counter-flow between two interfacing sides of adjacent cells.

2. A cell stack according to feature 1, wherein said cells are Solid Oxide Fuel Cells.

3. A cell stack according to feature 1, wherein said cells are Solid Oxide Electrolysis Cells.

4. A cell stack according to any of the preceding features comprising at least one set of primary cells and one set of secondary cells, wherein the anode outlet gas of at least one primary cell is redistributed to the anode inlet portion of at least one secondary cell, whereby the primary anode outlet gas performs a second cell flow pass.

5. A cell stack according to any of the features 1 to 3 comprising at least one set of primary cells and one set of secondary cells, wherein the cathode outlet gas of at least one primary cell is redistributed to the cathode inlet portion of at least one secondary cell, whereby the primary cathode outlet gas performs a second cell flow pass.

6. A cell stack according to any of the features 1 to 3 comprising at least one set of primary cells and one set of secondary cells, wherein the anode outlet gas of at least one primary cell is redistributed to the anode inlet portion of at least one secondary cell and the cathode outlet gas of at least one primary cell is redistributed to the cathode inlet portion of at least one secondary cell, whereby the primary anode outlet gas and the primary cathode outlet gas perform a second cell flow pass.

7. A cell stack according to any of the features 4 to 6, wherein the anode outlet gas of all primary cells is collected, mixed and redistributed to the anode inlet gas portion of all secondary cells, or the cathode outlet gas of all primary cells is collected, mixed and redistributed to the cathode inlet gas portion of all secondary cells, or both the anode outlet gas of all primary cells is collected, mixed and redistributed to the anode inlet gas portions of all secondary cells and the cathode outlet gas of all primary cells is collected, mixed and redistributed to the cathode inlet gas portion of all secondary cells, whereby the primary anode outlet gas or the primary cathode outlet gas or both the primary anode outlet gas and the primary cathode outlet gas perform a second cell flow pass.

8. A cell stack according to any of the features 4 to 6, wherein the anode outlet gas of each primary cell is redistributed to the anode inlet gas portion of at least one adjacent secondary cell, or the cathode outlet gas of each primary cell is redistributed to the cathode inlet gas portion of at least one adjacent secondary cell, or both the anode outlet gas of each primary cell is redistributed to the anode inlet gas portion of at least one adjacent secondary cell and the cathode outlet gas of each primary cell is redistributed to the cathode inlet gas portion of at least one adjacent secondary cell, whereby the primary anode outlet gas or the primary cathode outlet gas or both the primary anode outlet gas and the primary cathode outlet gas of each primary cell perform a second cell flow pass in at least one adjacent secondary cell.

9. A cell stack according to feature 7 or 8, wherein the anode and cathode gas inlet and outlet portions of said at least one primary cell are oriented such that the at least one primary cell has anode gas flow in a first direction and cathode gas flow in a second substantially opposite direction relative to the anode gas flow direction such that said primary cell internally has counter-flow and said at least two adjacent secondary cells have anode gas flow in said second direction and cathode gas flow in said second direction such that said at least two adjacent secondary cells internally have co-flow ("I").

10. A cell stack according to feature 7 or 8, said stack comprising at least one set of primary cells and adjacent secondary cells, wherein the anode outlet gas of at least one primary cell is directed to the anode inlet portion of at least one secondary cell, whereby the primary anode outlet gas performs a second flow pass through said secondary cell, and whereby the at least one primary cell has anode gas flow in a first direction and cathode gas flow in a second substantially opposite direction relative to the anode gas flow direction such that said primary cell internally has counter-flow and said at least one secondary cell has anode gas flow in said second direction and cathode gas flow in said second direction such that said at least one secondary cell internally has co-flow ("H").

11. A cell stack according to any of the features 1 to 3, said stack comprising at least one set of primary cells and adjacent secondary cells, wherein at least one primary cell has anode gas flow in a second direction and cathode gas in a first substantially opposite direction relative to the anode gas flow direction such that said primary cell internally has counter-flow and said at least one adjacent secondary cell has anode gas flow in said first direction and cathode gas flow in said first direction such that said at least one secondary cell internally has co-flow ("C").

12. A cell stack according to any of the features 1 to 3, said stack comprising at least one set of primary cells and adjacent secondary cells, wherein at least one primary cell has anode gas flow in a first direction and cathode gas in said first direction such that said primary cell internally has co-flow and said at least one adjacent secondary cell has anode gas flow in a second direction substantially opposite to said first direction and cathode gas flow in said second direction such that said at least one secondary cell internally has co-flow ("A").

13. A cell stack according to any of the features 1 to 3, said stack comprising at least one set of primary cells and adjacent secondary cells, wherein at least one primary cell has anode gas flow in a first direction and cathode gas in said first direction such that said primary cell internally has co-flow and said at least one adjacent secondary cell has anode gas flow in said first direction and cathode gas flow in a second direction substantially opposite to said first direction such that said at least one secondary cell internally has counter-flow ("B").

14. A cell stack according to feature 7 or 8, said stack comprising at least one set of primary cells and adjacent secondary cells, wherein the anode outlet gas of at least two primary cells is merged into one primary anode outlet gas flow and directed to the anode inlet portion of at least one secondary cell, whereby the primary anode outlet gas performs a second flow pass through said secondary cell and the at least two primary cells have anode gas flow in a first direction and cathode gas flow in a second direction substantially opposite to said first direction such that said primary cells internally have counter-flow and said at least one secondary cell has anode gas flow in said second direction and cathode gas flow in said second direction such that said at least one secondary cell internally has co-flow ("J").

15. A cell stack according to any of the features 9 to 14, wherein cell sets according to any of the features 9 to 14 are combined into stacks comprising a plurality of sets in combination.

16. A fuel cell stack comprising a plurality of fuel cells arranged in layers on top of each other, each of said fuel cells comprising an anode an electrolyte and a cathode, where each layer of fuel cells is divided by a plurality of interconnects, one between each fuel cell, where the interconnects provide electrical contact from one fuel cell to the adjacent cell(s), and where said interconnects are provided with gas channels on each side, anode gas channels on one side of each interconnect and cathode gas channels on the other side of each interconnect, where the gas channels run from an inlet portion to an outlet portion of said interconnects, the substantial direction from the anode inlet portion to the anode outlet portion of the anode side of each interconnect defining the anode gas flow direction of each interconnect and the substantial direction from the cathode inlet portion to the cathode outlet portion of the cathode side of each interconnect defining the cathode gas flow direction of each interconnect, where each fuel cell in the stack has one of:
  co-flow of the anode gas flow direction relative to the cathode gas flow direction or,
  cross-flow of the anode gas flow direction relative to the cathode gas flow direction or,
  counter-flow of the anode gas flow direction relative to the cathode gas flow direction, where the interfacing sides of adjacent fuel cells are oriented in either of:
- co-flow
- cross-flow
- counter-flow, wherein the stacked fuel cells are arranged such that each individual cell and adjacent cells have a combination of said co-flow, cross-flow or counter-flow of the anode gas direction relative to the cathode gas flow direction in each individual cell and have a combination of said co-flow, cross-flow or counter-flow between two interfacing sides of adjacent cells.

17. A fuel cell stack according to feature 16 wherein said fuel cells are planar fuel cells and each successive layer of fuel cells are arranged such that the anode side of one fuel cell faces the cathode side of the adjacent fuel cell and the cathode side of one fuel cell faces the anode side of the adjacent cell, the interfacing anode and cathode sides of adjacent fuel cells being oriented in either of:
- co-flow of the anode gas flow direction relative to the cathode gas flow direction or,
- cross-flow of the anode gas flow direction relative to the cathode gas flow direction or,
- counter-flow of the anode gas flow direction relative to the cathode gas flow direction, wherein the stacked fuel cells are arranged such that each individual cell and adjacent cells have a combination of said co-flow, cross-flow or counter-flow of the anode gas direction relative to the cathode gas flow direction in each individual cell and between two interfacing sides of adjacent cells.

18. A fuel cell stack according to feature 16 or 17 wherein said fuel cells are Solid Oxide Fuel Cells.

19. A fuel cell stack according to feature 16 or 17 or 18 comprising at least one set of primary cells and one set of secondary cells, wherein the anode outlet gas of at least one primary cell is redistributed to the anode inlet portion of at least one secondary cell, whereby the primary anode outlet gas performs a second fuel cell flow pass.

20. A fuel cell stack according to feature 16 or 17 or 18 comprising at least one set of primary cells and one set of secondary cells, wherein the cathode outlet gas of at least one primary cell is redistributed to the cathode inlet portion of at least one secondary cell, whereby the primary cathode outlet gas performs a second fuel cell flow pass.

21. A fuel cell stack according to feature 16 or 17 or 18 comprising at least one set of primary cells and one set of secondary cells, wherein the anode outlet gas of at least one primary cell is redistributed to the anode inlet portion of at least one secondary cell and the cathode outlet gas of at least one primary cell is redistributed to the cathode inlet portion of at least one secondary cell, whereby the primary anode outlet gas and the primary cathode outlet gas perform a second fuel cell flow pass.

22. A fuel cell stack according to any of the features 19 to 21, wherein the anode outlet gas of all primary cells is collected, mixed and redistributed to the anode inlet gas portion of all secondary cells, or the cathode outlet gas of all primary cells is collected, mixed and redistributed to the cathode inlet gas portion of all secondary cells, or both the anode outlet gas of all primary cells is collected, mixed and redistributed to the anode inlet gas portions of all secondary cells and the cathode outlet gas of all primary cells is collected, mixed and redistributed to the cathode inlet gas portion of all secondary cells, whereby the primary anode outlet gas or the primary cathode outlet gas or both the primary anode outlet gas and the primary cathode outlet gas perform a second fuel cell flow pass.

23. A fuel cell stack according to any of the features 19 to 21, wherein the anode outlet gas of each primary cell is redistributed to the anode inlet gas portion of at least one adjacent secondary cell, or the cathode outlet gas of each primary is cell redistributed to the cathode inlet gas portion of at least one adjacent secondary cell, or both the anode outlet gas of each primary cell is redistributed to the anode inlet gas portion of at least one adjacent secondary cell and the cathode outlet gas of each primary cell is redistributed to the cathode inlet gas portion of at least one adjacent secondary cell, whereby the primary anode outlet gas or the primary cathode outlet gas or both the primary anode outlet gas and the primary cathode outlet gas of each primary fuel cell perform a second fuel cell flow pass in at least one adjacent secondary fuel cell.

24. A fuel cell stack according to feature 16 or 17 or 18 comprising at least one set of primary cell and adjacent secondary cells, wherein the anode outlet gas of at least one primary cell is redistributed to the anode inlet portion of at least one adjacent secondary cell, whereby the primary anode outlet gas performs a second fuel cell flow pass.

25. A fuel cell stack according to feature 24, wherein the anode outlet gas of at least one primary cell is split and redistributed to the anode inlet portion of at least two adjacent secondary cells.

26. A fuel cell stack according to feature 24, wherein the anode outlet gas of at least two primary cells is merged and redistributed to the anode inlet portion of at least one adjacent secondary cell.

27. A fuel cell stack according to any of the preceding features, comprising at least one set of primary and adjacent secondary cells, wherein the cathode outlet gas of at least one primary cell is redistributed to the cathode inlet portion of at least one adjacent secondary cell, whereby the primary cathode outlet gas performs a second fuel cell flow pass.

28. A fuel cell stack according to feature 27, wherein the cathode outlet gas of at least one primary cell is split and redistributed to the cathode inlet portion of at least two adjacent secondary cells.

29. A fuel cell stack according to feature 27, wherein the cathode outlet gas of at least two primary cells is merged and redistributed to the cathode inlet portion of at least one adjacent secondary cell.

30. A fuel cell stack according to feature 16 or 17 or 18 comprising at least one set of primary cells and adjacent secondary cells, wherein the anode outlet gas of at least one primary cell is split into two primary anode outlet gas flows and directed to the anode inlet portion of at least two adjacent secondary cells arranged on each side of said at least one primary cell, whereby the primary anode outlet gas performs a second flow pass through said secondary fuel cells.

31. A fuel cell stack according to feature 30, wherein the anode and cathode gas inlet and outlet portions of said at least one primary fuel cell are oriented such that the at least one primary fuel cell has anode gas flow in a first direction and cathode gas flow in a second substantially opposite direction relative to the anode gas flow direction such that said primary fuel cell internally has counter-flow and said at least two adjacent secondary fuel cells has anode gas flow in said second direction and cathode gas flow in said second direction such that said at least two adjacent secondary fuel cells internally have co-flow ("I").

32. A fuel cell stack according to feature 16 or 17 or 18, said stack comprising at least one set of primary cells and adjacent secondary cells, wherein the anode outlet gas of at least one primary cell is directed to the anode inlet portion of at least one adjacent secondary adjacent cell, whereby the primary anode outlet gas performs a second flow pass through said secondary fuel cell, and whereby the at least one primary fuel cell has anode gas flow in a first direction and cathode gas flow in a second substantially opposite direction relative to the anode gas flow direction such that said primary fuel cell internally has counter-flow and said at least one adjacent secondary fuel cell has anode gas flow in said second direction and cathode gas flow in said second direction such that said at least one secondary fuel cell internally has co-flow ("H").

33. A fuel cell stack according to feature 16 or 17 or 18, said stack comprising at least one set of primary cells and adjacent secondary cells, wherein at least one primary fuel cell has anode gas flow in a second direction and cathode gas in a first substantially opposite direction relative to the anode gas flow direction such that said primary fuel cell internally has counter-flow and said at least one adjacent secondary fuel cell has anode gas flow in said first direction and cathode gas flow in said first direction such that said at least one secondary fuel cell internally has co-flow ("C").

34. A fuel cell stack according to feature 16 or 17 or 18, said stack comprising at least one set of primary cells and adjacent secondary cells, wherein at least one primary fuel cell has anode gas flow in a first direction and cathode gas in said first direction such that said primary fuel cell internally has co-flow and said at least one adjacent secondary fuel cell has anode gas flow in a second direction substantially opposite to said first direction and cathode gas flow in said second direction such that said at least one secondary fuel cell internally has co-flow ("A").

35. A fuel cell stack according to feature 16 or 17 or 18, said stack comprising at least one set of primary cells and adjacent secondary cells, wherein at least one primary fuel cell has anode gas flow in a first direction and cathode gas in said first direction such that said primary fuel cell internally has co-flow and said at least one adjacent secondary fuel cell has anode gas flow in said first direction and cathode gas flow in a second direction substantially opposite to said first direction such that said at least one secondary fuel cell internally has counter-flow ("B")

36. A fuel cell stack according to feature 16 or 17 or 18, said stack comprising at least one set of primary cells and adjacent secondary cells, wherein the anode outlet gas of at least one primary cell is directed to the anode inlet portion of at least one adjacent secondary adjacent cell, whereby the primary anode outlet gas performs a second flow pass through said secondary fuel cell, and whereby the at least one primary fuel cell has anode gas flow in a first direction and cathode gas flow in said first direction such that said primary fuel cell internally has co-flow and said at least one adjacent secondary fuel cell has anode gas flow in a second substantially opposite direction relative to said first direction and cathode gas flow in said first direction such that said at least one secondary fuel cell internally has counter-flow ("D").

37. A fuel cell stack according to feature 16 or 17 or 18, said stack comprising at least one set of primary cells and adjacent secondary cells, wherein the anode outlet gas of at least one primary cell is directed to the anode inlet portion of at least one adjacent secondary cell and the cathode outlet gas of said primary cell is directed to the cathode inlet of at said secondary cell, whereby the primary anode and cathode outlet gas performs a second flow pass through said secondary fuel cell, and whereby the at least one primary fuel cell has anode gas flow in a first direction and cathode gas flow in said first direction such that said primary fuel cell internally has co-flow and said at least one adjacent secondary fuel cell has anode gas flow in a second substantially opposite direction relative to said first direction and cathode gas flow in said second direction, such that said at least one secondary fuel cell internally has co-flow ("E").

38. A fuel cell stack according to feature 30 wherein the anode and cathode gas inlet and outlet portions of said at least one primary fuel cell are oriented such that the at least one primary fuel cell has anode gas flow in a first direction and cathode gas flow in said first direction such that said primary fuel cell internally has co-flow and said at least two adjacent secondary fuel cells have anode gas flow in a second direction substantially opposite to said first direction and cathode gas flow in said first direction such that said at least two adjacent secondary fuel cells internally have counter-flow ("F").

39. A fuel cell stack according to feature 16 or 17 or 18 said stack comprising at least one set of primary cells and adjacent secondary cells, wherein the anode outlet gas of at least two primary cells is merged into one primary anode outlet gas flow and directed to the anode inlet portion of at least one adjacent secondary cell arranged in-between said at least two primary cells, whereby the primary anode outlet gas performs a second flow pass through said secondary fuel cell and the at least two primary fuel cells have anode gas flow in a first direction and cathode gas flow in said first direction such that said primary fuel cells internally have co-flow and said at least one adjacent secondary fuel cell has anode gas flow in a second direction substantially opposite to said first direction and cathode gas flow in said first direction such that said at least one adjacent secondary fuel cell internally has counter-flow ("G").

40. A fuel cell stack according to feature 16 or 17 or 18, said stack comprising at least one set of primary cells and adjacent secondary cells, wherein the anode outlet gas of at least two primary cells is merged into one primary anode outlet gas flow and directed to the anode inlet portion of at least one adjacent secondary cell arranged in-between said at least two primary cells, whereby the primary anode outlet gas performs a second flow pass through said secondary fuel cell and the at least two primary fuel cells have anode gas flow in a first direction and cathode gas flow in a second direction substantially opposite to said first direction such that said primary fuel cells internally have counter-flow and said at least one adjacent secondary fuel cell has anode gas flow in said second direction and cathode gas flow in said second direction such that said at least one adjacent secondary fuel cell internally has co-flow ("J").

41. A fuel cell stack according to any of the features 30 to 40, wherein fuel cell sets according to any of the features 30 to 40 are combined into stacks comprising a plurality of sets in combination.

The invention is described in greater detail below with reference to the accompanying drawings, in which FIG. 1 is a schematic view showing the gas flow principle of the repeating element of a state of the art internal co-flow fuel cell, FIG. 2 shows the gas flow principle of the repeating element of a state of the art internal counter-flow fuel cell, FIG. 3 to FIG. 12 show the repeating element of different flow pattern combinations according to the present invention, combination "A" to "D" and "F" to "J", FIG. 13 shows power output per cell in stacks with flow pattern combination "A" to "D" and "F" to "J" and natural gas as fuel, FIG. 14 shows power output per cell in stacks with flow pattern combination "A" to "D" and "F" to "J" and hydrogen gas as fuel, FIG. 15 shows ASR in stacks with flow pattern combination "A" to "D" and "F" to "J" and natural gas as fuel, FIG. 16 shows ASR in stacks with flow pattern combination "A" to "D" and "F" to "J" and hydrogen gas as fuel, FIG. 17 shows ΔT for the cathode gas (cathode gas outlet temperature minus cathode gas inlet temperature) in stacks with flow pattern combination "A" to "D" and "F" to "J" and natural gas as fuel, FIG. 18 shows ΔT for the cathode gas in stacks with flow pattern combination "A" to "D" and "F" to "J" and hydrogen gas as fuel, FIG. 19 shows the average cell voltage in stacks with flow pattern combination "A" to "D" and "F" to "J" and natural gas as fuel, FIG. 20 shows the average cell voltage in stacks with flow pattern combination "A" to "D" and "F" to "J" and hydrogen gas as fuel, FIG. 21 shows the cell temperature along the flow direction for flow pattern combination "C" as compared to a conventional co-flow and a conventional counter-flow cell stack with natural gas as fuel, FIG. 22 shows the current density along the flow direction for flow pattern combination "C" as compared to a conventional co-flow and a conventional counter-flow cell stack with natural gas as fuel, FIG. 23 shows cell temperature along the flow direction for flow pattern combination "H" as compared to a conventional co-flow and a conventional counter-flow cell stack with natural gas as fuel, FIG. 24 shows the current density along the flow direction for flow pattern combination "H" as compared to a conventional co-flow and a conventional counter-flow cell stack with natural gas as fuel, FIG. 25 shows cell temperature along the flow direction for flow pattern combination "I" as compared to a conventional co-flow and a conventional counter-flow cell stack with natural gas as fuel, FIG. 26 shows the current density along the flow direction for flow pattern combination "I" as compared to a conventional co-flow and a conventional counter-flow cell stack with natural gas as fuel, FIG. 27 shows a principle drawing of CMR (Collect, Mix, Redistribute) with two primary and two secondary fuel cells, and FIG. 28 shows a principle drawing of serial connection of the anode side of two primary and two secondary cells.

In the following, a range of combined flow patterns are presented: combined cell internal flow patterns, alternating flow patterns between adjacent cells in a stack as well as combinations of cathode gas and anode gas flow passes through either only a single cell or a plurality of serially connected cells before exhaust of the gasses from the stack with or without merge or split of the gas flows. Though the following embodiments of the invention from pattern "A" to "J" are many, they are not exhausting. The invention according to the independent claim 1 covers a wide range of combination of flow patterns and the following examples of embodiments are not to be interpreted as limiting the scope of the present invention.

FIGS. 1 and 2 show two conventional gas flow principles of a fuel cell: The cathode gas, for instance air, is shown as a continuous line arrow and the anode gas, for instance natural gas or hydrogen gas, is shown as a dotted line arrow. The fuel cell comprising anode, cathode and electrolyte is shown as a full line. As seen in these principle drawings, the anode gas and the cathode gas flow on opposite sides of the fuel cell. The anode and cathode gas inlets are not shown as these are not an essential part of the invention. Important is the substantial flow direction of the anode gas relative to the cathode gas. The substantial flow direction is defined as the substantial direction from the inlet portion to the outlet portion. In this context when using the term "substantial", it is to be understood that the inlet portion and the outlet portion are not necessarily a single point, but can have a certain extent for instance when using side manifolding. Therefore the flow direction cannot always be defined exactly from one point to another, but rather as a "substantial" direction from an average median point of the inlet and an average median point of the outlet within the inlet and outlet portions. Still the "substantial" flow direction is defined accurately enough to determine whether the anode gas and the cathode gas flow in the overall same direction, opposite direction or perpendicular direction which corresponds to the concepts co-flow, counter-flow or cross-flow which are substantial to define the present invention. Thus FIG. 1 shows a conventional co-flow fuel cell whereas FIG. 2 shows a conventional counter-flow fuel cell, each with the inherent characteristics and advantages as already explained.

When assembling a plurality of fuel cells in a stack, each fuel cell is separated by an interconnect which serves (among other things) to separate the anode flow gas of one cell from the cathode flow gas of its adjacent cell. As in conventional fuel cell stacks, stacking a plurality of co-flow cells as shown in FIG. 1 then leads to a stack with co-flow internally in each cell and co-flow of adjacent cells on each side of the interconnects, hereafter referred to as "interconnect" co-flow. Correspondingly, when stacking a plurality of counter-flow cells according to FIG. 2, it leads to a stack with internal cell counter-flow and interconnect counter-flow.

FIGS. 3 to 12 all show different embodiments of the present invention, where co-flow and counter-flow as well as plural gas flow passes (redistribution), merge and split of gas streams are combined. In FIG. 3 a primary cell and a secondary adjacent cell are shown separated by an interconnect (shown as a narrow dotted line). The primary cell as well as the secondary cell has internal co-flow. However, the flow directions of the primary cell are opposite the flow directions of the adjacent secondary. Therefore, as seen on the figure, the two cells have interconnect counter-flow. And in total, flow pattern combination "A" according to FIG. 3 has internal co-flow combined with internal co-flow and interconnect counter-flow. The flow pattern combination "A" should thus be expected to combine advantage 1 and advantage 2, since advantage 1 is especially related to counter-flow and advantage 2 is especially related to co-flow. Likewise, one might expect a high power output of such a stack, because a low ASR results in a low power loss in the stack. The low ASR is due to the relatively flat temperature profile and high average temperature, which is the result of averaging the temperature profiles of the primary and secondary cells. However, according to the test results, the power output from such a stack is relatively low, because the low ΔT for combination "A" results in too little heat removal by the cathode air. Therefore, combination "A" lacks advantage 2, but has a clear advantage 1. Hence it is not simple to predict the effect and advantages of the different possible flow pattern combinations, only the test results can clarify which combinations obtain the optimal performance of the fuel cell stack. As will be seen in the following, the advantages can be even more complex optimized with more complex flow pattern combinations.

It is to be understood that the principle shown in FIG. 3 can be applied to the whole stack such that a plurality of stacked cells (more than two) can have internal co-flow and interconnect counter-flow when the flow directions change on opposite sides of each interconnect in the stack. Further, the flow principle of FIG. 3 can be combined with any of the flow principles in FIGS. 1 to 2 and 4 to 12.

FIG. 4 shows flow pattern combination "B" where a primary cell with internal counter-flow is adjacent to a secondary cell with internal co-flow, and the flow streams on each side of the separating interconnect are running in the same substantial direction on the two fuel cells shown. When stacking more cell sets according to combination "B", however, some have interconnect co-flow and some have interconnect counter-flow. Thus, flow pattern combination "B" has internal counter-flow combined with internal co-flow and combined with interconnect co-flow and interconnect counter-flow. Again, as is the case for all the shown flow pattern combinations, the principle shown for the two cells in FIG. 4 can be repeated throughout a stack comprising a plurality of cells, or it can be combined with other flow pattern combinations for instance as shown in the preceding and following Figures.

In FIG. 5 flow pattern combination "C" is shown which differs from combination "B" in that "C" has alternating anode flow direction, whereas "B" has alternating cathode flow direction.

Flow pattern combination "D" shown in FIG. 6 includes the principle of having two cells in serial connection on the fuel side. As illustrated, the anode gas performs a first pass through a primary cell and then a second pass through an adjacent secondary cell before the anode gas is let out. In this way the fuel utilization coefficient is increased as a higher extent of the fuel is oxidized through the fuel cell stack. Thus, "D" has the combination: internal co-flow, internal counter-flow and anode gas redistribution.

A further embodiment related to "D" is shown in FIG. 7, viz. flow pattern combination "E", where also the cathode gas stream is redistributed such that the primary cell is serially connected to the secondary cell not only on the anode gas side, but also on the cathode gas side. In combination "E" both cells have however, internal co-flow such that in total combination "E" has: internal co-flow, interconnect counter-flow, anode gas redistribution and cathode gas redistribution.

FIG. 8 shows flow pattern combination "F" where a further possibility is utilized, namely the principle of splitting up a primary gas flow stream into two streams after a first flow pass and then redistributing the two streams to perform a second flow pass through two adjacent secondary cells. In combination "F" this is performed on the anode gas. As can be seen, all in all combination "F" includes in combination: internal co-flow, internal counter-flow, interconnect co-flow, interconnect counter-flow and anode gas split and redistribution.

FIG. 9 shows approximately the opposite embodiment to "F", namely flow pattern combination "G" which merges two primary anode gas streams into one stream after they have performed a first cell flow pass through two primary fuel cells, and then the merged anode gas stream is led to a secondary fuel cell where it performs a second flow pass. As illustrated, the two primary cells have internal co-flow of the anode gas relative to the cathode gas, and the secondary fuel cell has counter-flow. Thus, combination "G" has: internal co-flow and internal counter-flow, interconnect counter-flow and interconnect co-flow and anode gas merge and redistribution. When applying the principle of combination "G" to a whole stack comprising a plurality of cells, it is understood that couples of primary cells are adjacent to each other separated by interconnects. Depending on the application, these primary cells can have either interconnect co-flow or counter-flow.

Flow pattern combination "H" is shown in FIG. 10. Here anode gas redistribution from a primary cell to a secondary cell is combined with internal counter-flow in the primary cell, internal co-flow in the secondary cell.

In FIG. 11, combination "I" is shown where a primary fuel cell anode gas flow stream is split into two secondary streams after passing a primary fuel cell. The two secondary anode gas flow streams then performs a second flow pass through two secondary fuel cells before being let out. The primary fuel cell has internal counter-flow while the secondary fuel cells have internal co-flow. To summarize, combination "I" thus includes: internal counter-flow in primary cells, internal co-flow in secondary cells, interconnect co-flow, interconnect counter-flow and anode gas split and redistribution.

FIG. 12 shows the last of the exemplified embodiments according to the invention. Combination "J" has a merging of two primary anode gas flow streams into one secondary anode gas flow stream. Further "j" has internal counter-flow of the primary fuel cells, internal co-flow of the secondary fuel cell and interconnect co-flow as well as interconnect counter-flow.

To be able to compare the performance of the flow pattern combination "A" to "J", fixed process parameters have been chosen:

Cathode Gas Inlet Temperature: $T_{in}=700°$ C.
Maximum Temperature: $T_{max}=827°$ C.

at fixed fuel utilization coefficient and cathode gas utilization coefficients. For these fixed operation parameters the resulting current, output, I and average cell voltage U for each of the flow pattern combinations are observed. The results can also be stated as average power pr. cell, $P=U*I$ and ASR (Area Specific Resistance). It is interesting to get these results for both reforming and non-reforming fuels. Therefore the results of the different flow pattern combinations are observed for both natural gas and hydrogen as fuel.

It is noted that test results for combination "E" are not shown since $\Delta T$ for this combination is too low to give meaningful test results.

An important object of the invention is to be able to achieve the highest possible power per fuel cell, whereby fewer cells per stack are necessary to get a certain power output, thus at a lower cost. The power output of each of the flow pattern combinations "A" to "J" as well as the two conventional art references "RefCof" (reference for co-flow pattern) and "RefCou" (reference for counter-flow pattern) is seen as a bar chart in FIG. 13 for natural gas, and FIG. 14 for hydrogen gas as anode gas. The power is indicated as Watt per fuel cell, W/cell, on the Y-axis of the bar charts. The flow pattern combinations giving the highest power output does this primarily for two reasons: low ASR, which relates to "advantage one" and high $\Delta T$ (cathode outlet minus cathode inlet temperature) which relates to "advantage two".

In FIGS. 15 to 18, ASR and $\Delta T$ for the different flow pattern combinations are shown for natural gas and hydrogen respectively. In FIGS. 15 and 16, the ASR is marked at the Y-axis in milli-ohms square centimeter for natural gas, "ng" and hydrogen "H2". The flow pattern combinations "D"-"J" have the additional advantage of fuel CMR, viz. the "advantage 3".

As seen in FIGS. 13 to 20, the flow pattern combinations "C", "H", "I" and "J" have a larger power output than the conventional flow patterns co-flow and counter-flow. With natural gas as anode gas, combination "I" has power density which is 15% higher than the conventional co-flow and 31% higher than counter-flow. "H", "I" and "J" have the additional advantage that they allow fuel CMR internally in the stack ("advantage 3").

An example to understand these advantages can be seen when comparing the data of FIGS. 13 to 20. For instance when looking at combination "C" which is a hybrid between co-flow and counter-flow. The current output is distributed appropriately to achieve the largest current output from the hottest zones as is the case for conventional counter-flow. This results in a low ASR, (lower than co-flow, but insignificantly larger than counter-flow—"advantage 1"). Concurrently the combined flow pattern results in a higher ΔT for the cathode gas which means more effective cooling of the cells ("advantage 2"). The more effective cooling means a larger current output before the fixed $T_{max}$ is reached.

Figure 13:
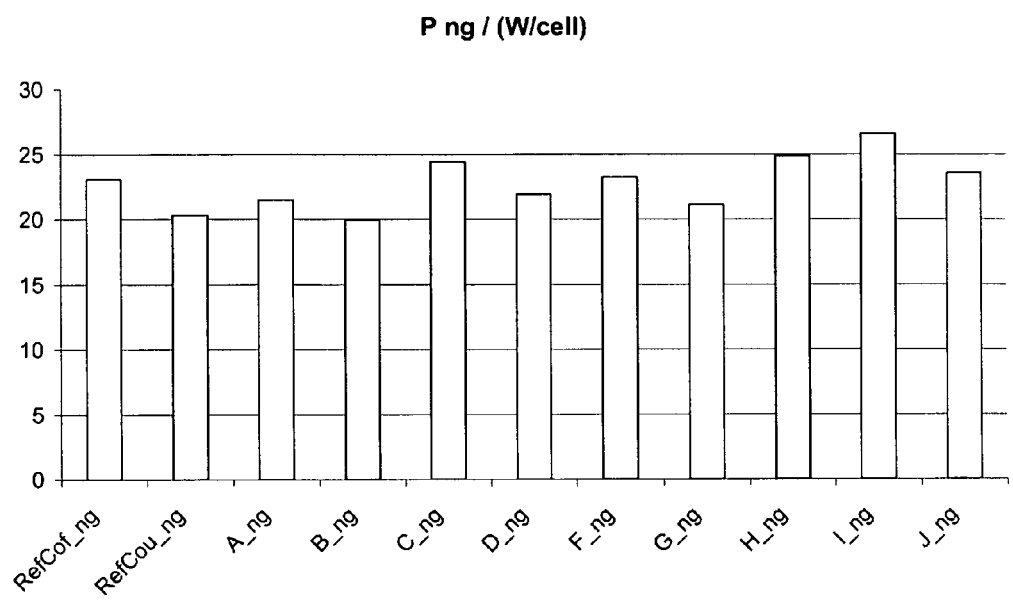
Figure 14:
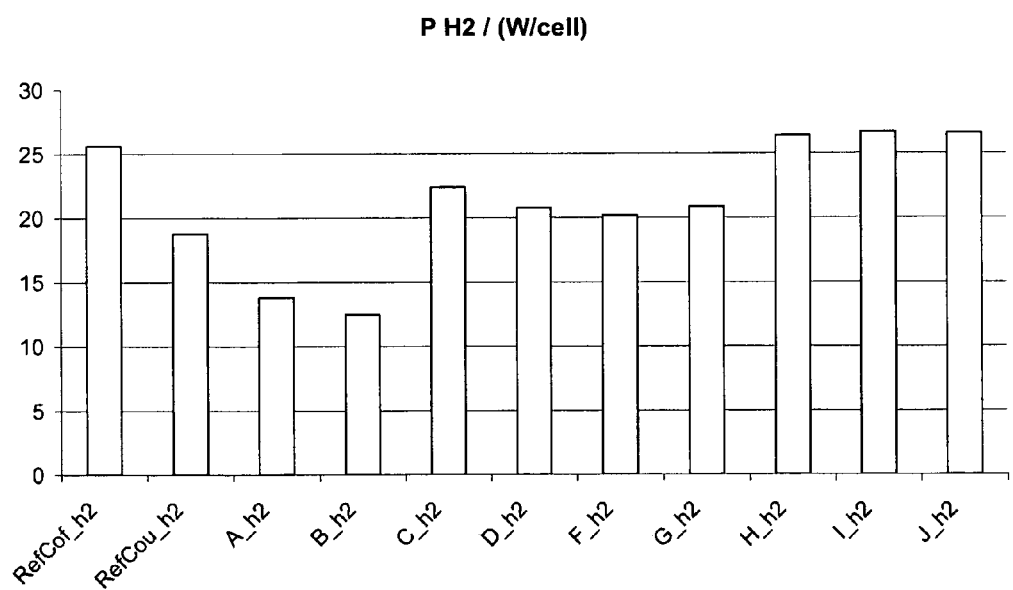
Figure 15:
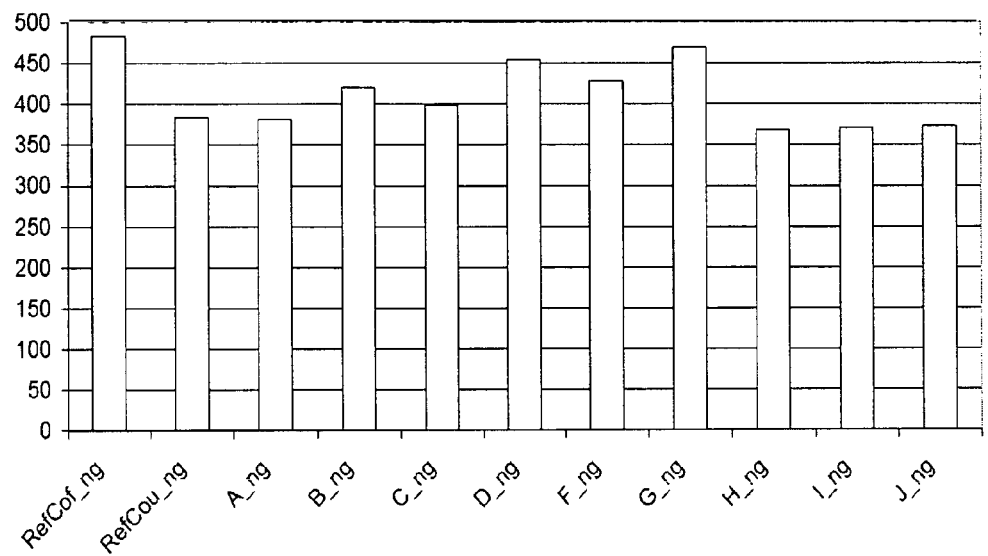
Figure 16:
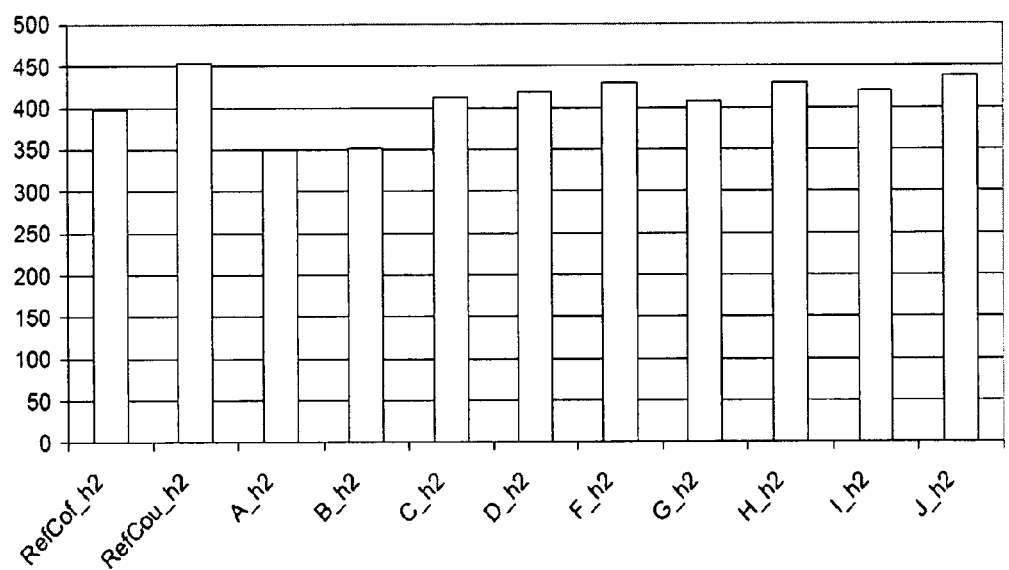
Figure 17:
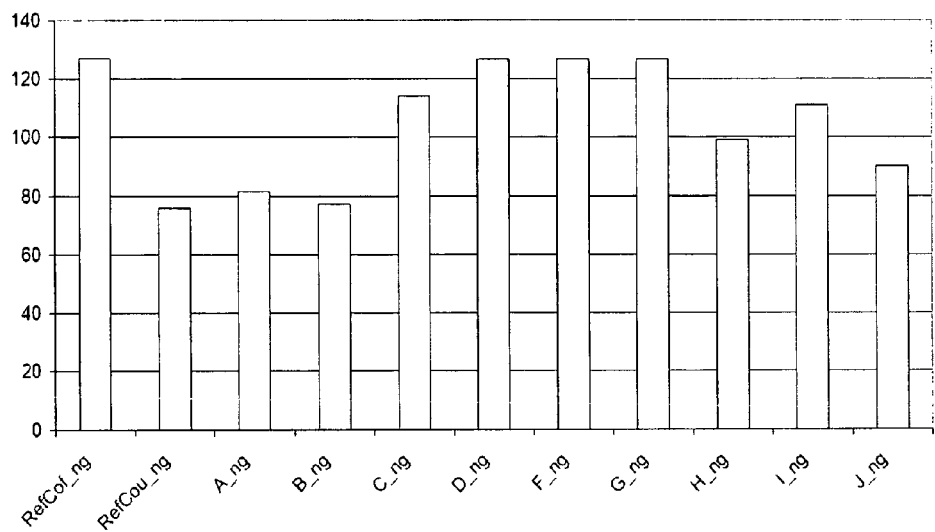
FIGS. 17 and 18 show the difference between the gas outlet temperature and the gas inlet temperature, $\Delta T$ in degrees Celsius (at the Y-axis) for the different shown flow pattern combinations for both natural gas, "ng" and hydrogen gas "H2" as anode gas.
Figure 18:
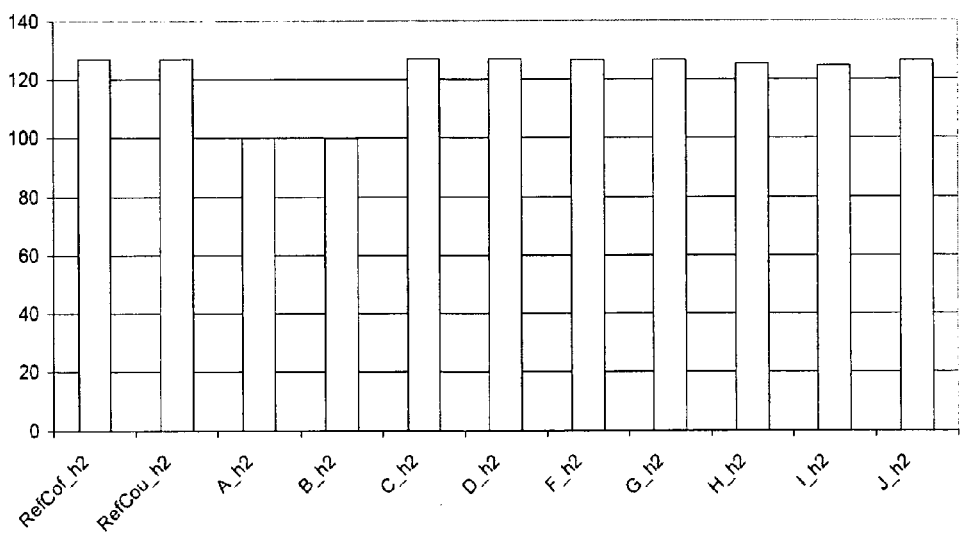
Figure 19:
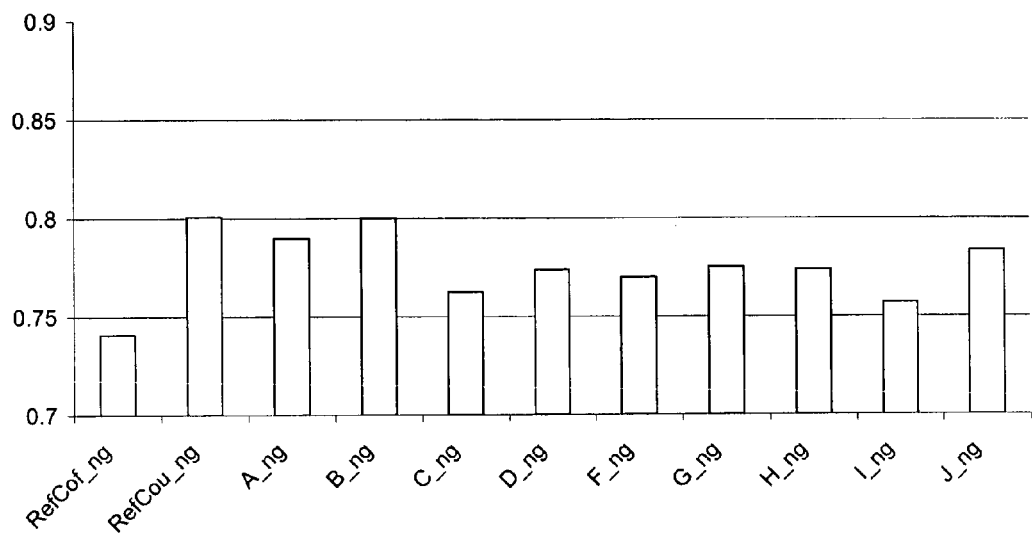
FIGS. 19 and 20 show the average cell voltage in volts (at the Y-axis) for the different shown flow pattern combinations with natural gas, "ng" and hydrogen gas "H2" as anode gas.
Figure 20:
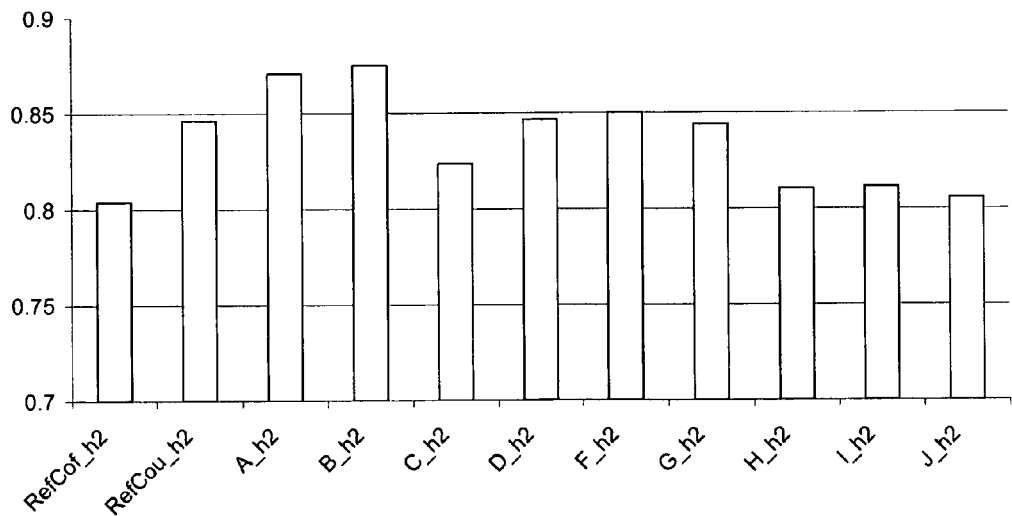
Figure 21:
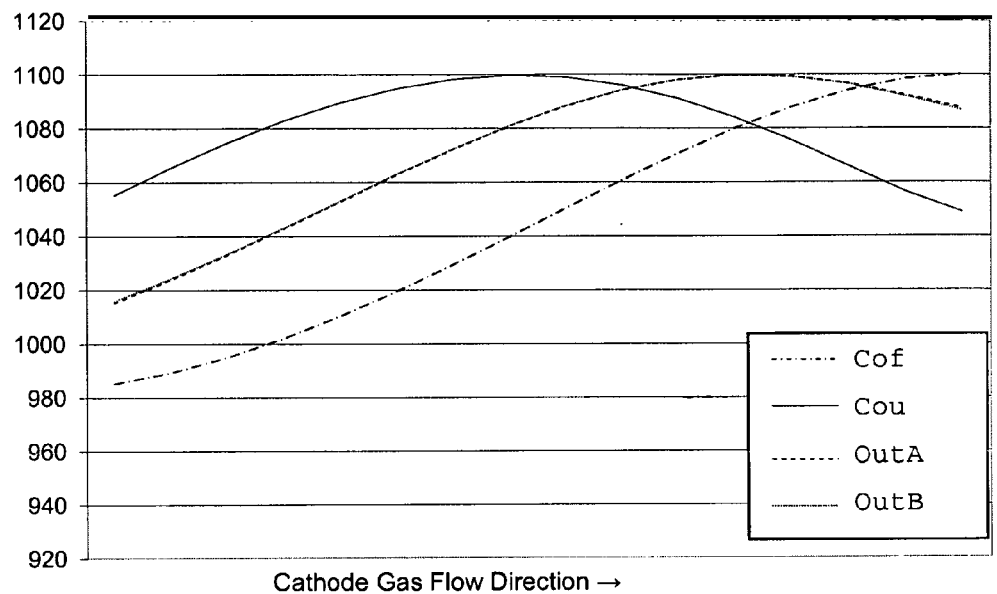
Figure 22:
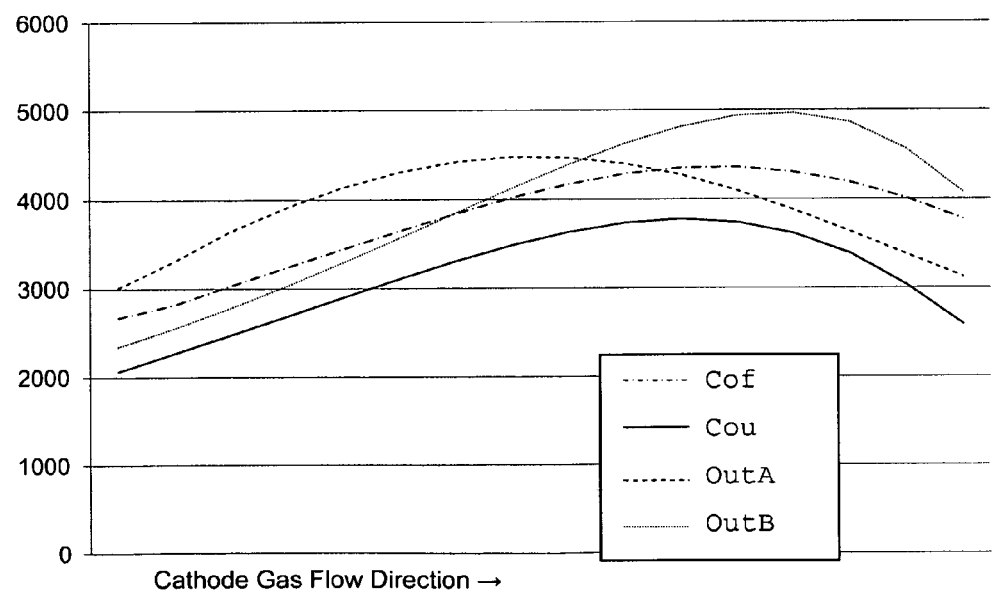
Figure 23:
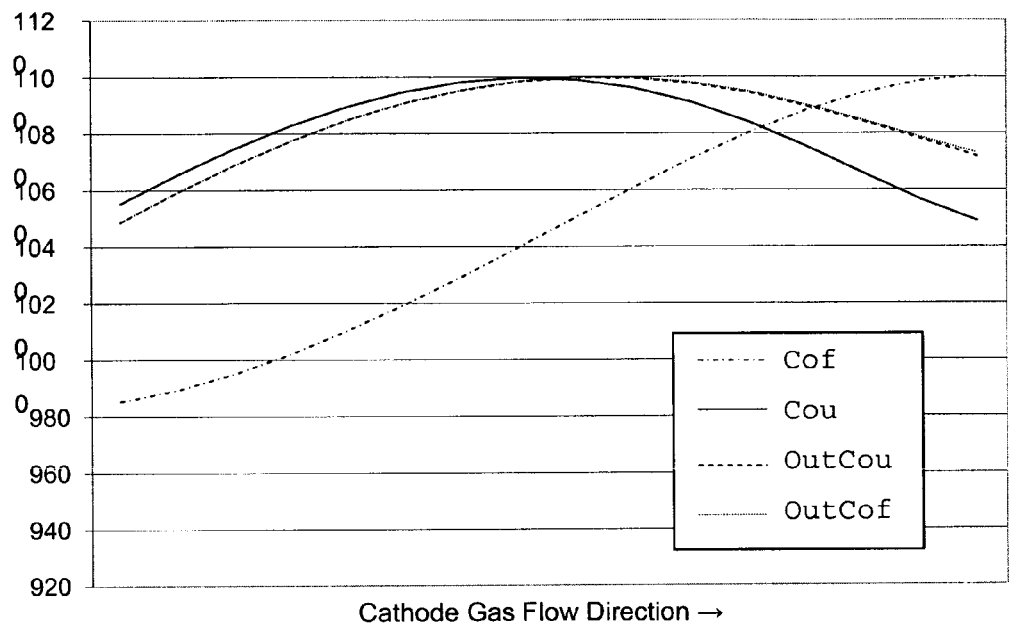
Figure 24:
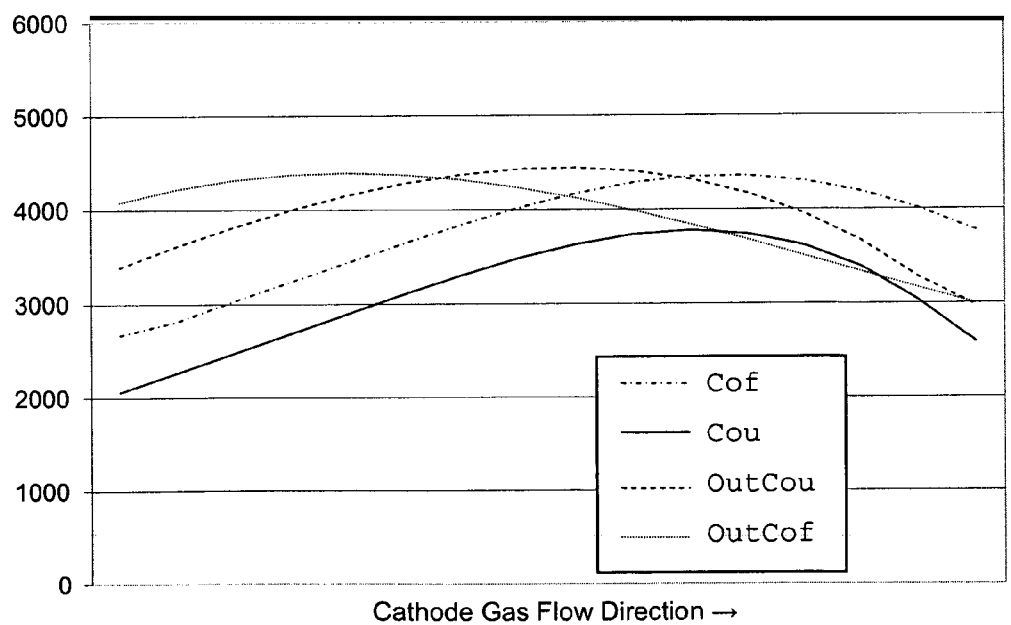
Figure 25:
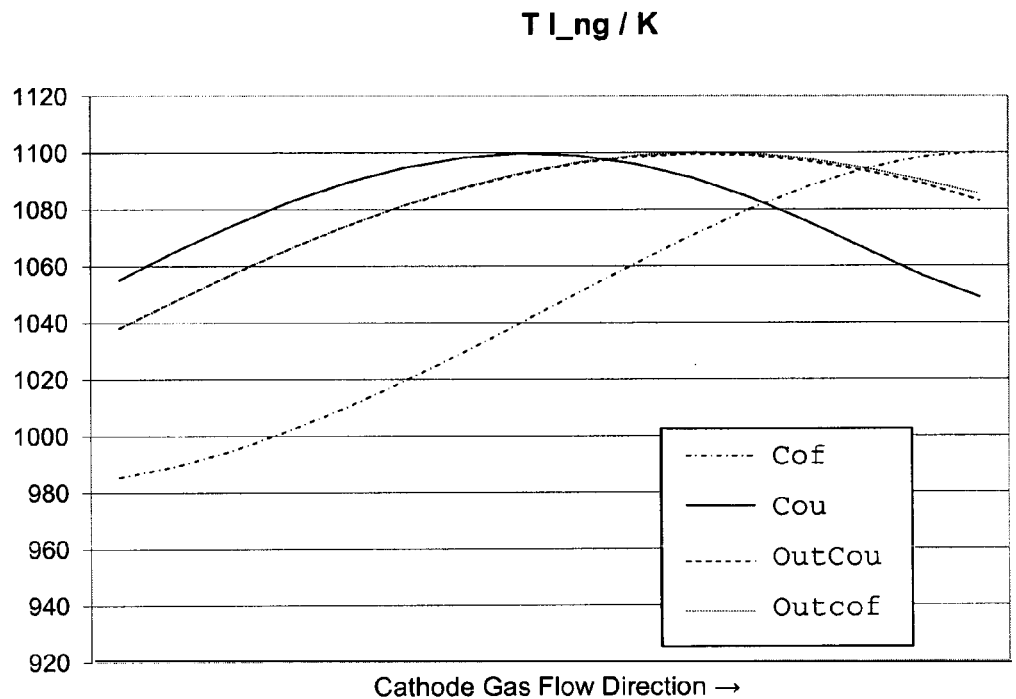
Figure 26:
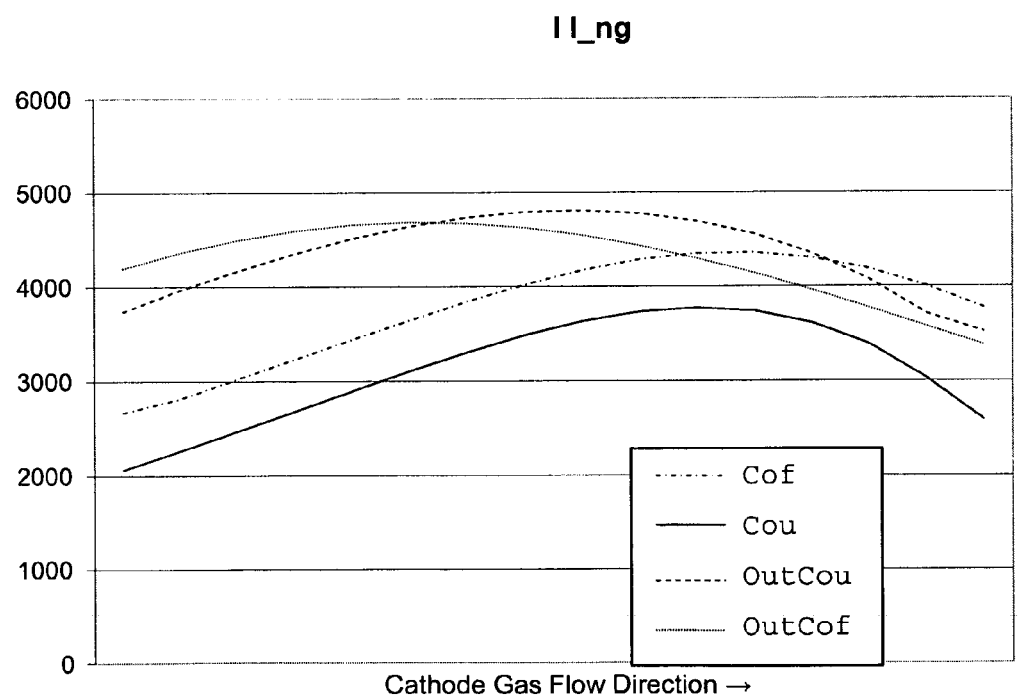

To illustrate, the temperature and current density distribution for combination "C" is shown in FIGS. 21 and 22 compared to conventional co-flow and counter-flow. "Advantage 1" is seen as a broad distribution of the current output, which at the same time has a good convergence with the temperature distribution (OutA and OutB stand for the primary and secondary cell of combination "C", the Y-axes counts the temperature in Kelvin and current density in amps per square meter, $A/m^2$ respectively). "Advantage 2" is seen as a cathode gas outlet temperature which is increased as compared to counter-flow.

FIGS. 23 to 26 show the same temperature and current density distribution only now for combination "H" and "I". Also for these two combinations a broad distributed current density is observed which converges well with the temperature distribution ("advantage 1") and effective cooling because of high $T_{out}$ ("advantage 2"). Both combinations "H" and "I" also have fuel CMR ("advantage 3"). It appears from the Figures that combination "I" has slightly better performance than "H". Since "I" and "H" have almost equal, low ASR, the better performance of "I" must primarily be attributed to a slightly more effective cooling.

The flow pattern combinations "C", "H", "I" and "J" have with both natural gas and hydrogen as anode gas the same or higher cell voltage than co-flow has. Therefore also a lower cell degradation than is the case for co-flow must be expected even though "C", "H", "I" and "J" have a higher average power density. When comparing with counter-flow, "C", "H" and "I" have a significant higher average power density, but also a lower cell voltage. This is due to the preconditions of the comparison, where $T_{in}$ and $T_{max}$ are constant, while the voltage and the current vary. Therefore it is possible that a higher degradation velocity is also the effect of these operation parameters.

An evident drawback of the combined flow patterns according to the present invention is the apparent need for a more complex gas manifolding system for the fuel cell stack, which would entail a lower active area of the fuel cells. Simple geometrical considerations show however that this reduced efficiency is less than the profit from gain in power density. Furthermore, both combination "C", "H", "I" and "J" can be realized with cathode gas side manifolds.

It is remarkable that combination "A" and "B" give the possibility of low ASR ("advantage 1") also with a non-reforming fuel (such as hydrogen). This is due to the opposing cathode flow direction of primary and secondary cells, which in turn leads to a flat temperature profile. In combination with cooling by other means than cathode gas, this can give a high electrical efficiency and a high yield, in particular with non-reforming fuels.

Figure 27:
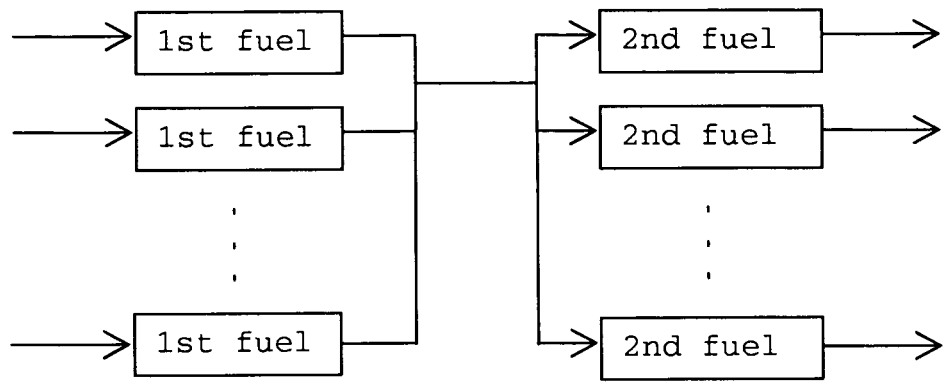
Figure 28:
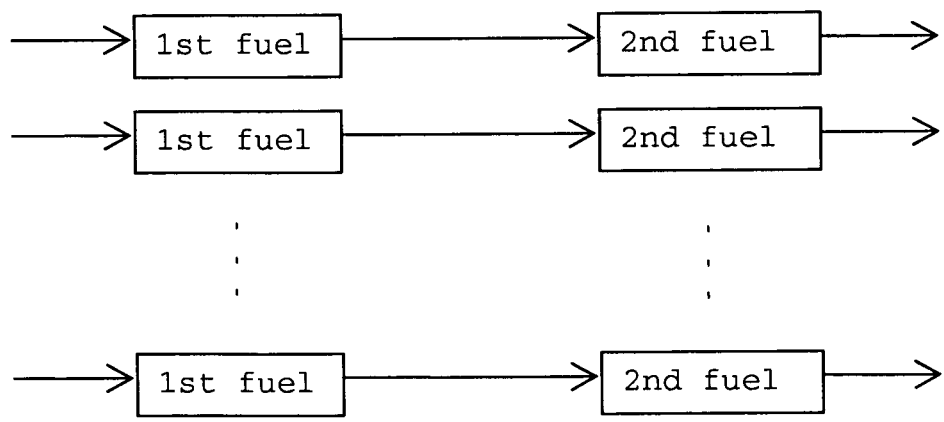

FIGS. 27 and 28 show two embodiments enabling a higher maximum fuel utilization coefficient. FIG. 27 shows CMR (Collect, Mix, Redistribute) where the gas outlet flow streams from a plurality of cells is collected into one common intermediate gas flow stream before it is again split into a plurality of gas flow streams which perform a second flow pass through a plurality of secondary fuel cells. This improves the stack tolerance against rare, but serious faults in the fuel supply for some single cells of the stack.

FIG. 28 shows an embodiment where the gas flows from separate primary cells to separate secondary cells in serial connection where a second flow pass across the cell is performed by the gas. Thus, the fuel supply for two cells in serial connection is dependant on the total pressure loss over the two cells concerned, and therefore a partly equalisation of variation of the pressure loss of the individual cell is achieved. This embodiment improves the stack tolerance against less serious, but more frequent faults.

The invention claimed is:

1. A cell stack, comprising a plurality of fuel cells or electrolysis cells arranged in layers on top of each other, each of said cells comprising an anode an electrolyte and a cathode, each layer of cells is divided by a plurality of interconnects, one between each cell, the interconnects are provided with gas channels on each side facing the anode or cathode side of the adjacent cell, the gas channels run from an inlet portion to an outlet portion of said cells, the substantial direction from the anode inlet portion to the anode outlet portion of the anode side of each cell defines the anode gas flow direction of each cell and the substantial direction from the cathode inlet portion to the cathode outlet portion of the cathode side of each cell defines the cathode gas flow direction of each cell, each cell in the stack has one of:
    internal co-flow of the anode gas flow direction relative to the cathode gas flow direction or,
    internal cross-flow of the anode gas flow direction relative to the cathode gas flow direction or,
    internal counter-flow of the anode gas flow direction relative to the cathode gas flow direction
the interfacing sides of adjacent cells on each side of an interconnect are oriented in either of:
    interconnect co-flow
    interconnect cross-flow
    interconnect counter-flow,
    wherein the stacked cells are arranged such that each individual cell and adjacent cells have a combination of said internal co-flow, internal cross-flow or internal counter-flow of the anode gas direction relative to the cathode gas flow direction internally in each individual cell and have a combination of said interconnect co-flow, interconnect cross-flow or interconnect counter-flow between two interfacing sides of adjacent cells,
    said stack comprising at least one set of primary cells and adjacent secondary cells, wherein the anode outlet gas of at least one primary cell is directed to the anode inlet portion of at least one secondary cell, whereby the primary anode outlet gas performs a second flow pass through said secondary cell,
    wherein the anode outlet gas of all primary cells is collected, mixed and redistributed to the anode inlet gas portion of all secondary cells, or the cathode outlet gas of all primary cells is collected, mixed and redistributed to the cathode inlet gas portion of all secondary cells, or both the anode outlet gas of all primary cells is collected, mixed and redistributed to the anode inlet gas portions of all secondary cells and the cathode outlet gas of all primary cells is collected, mixed and redistributed to the cathode inlet gas portion of all secondary cells, whereby the primary anode outlet gas or the primary cathode outlet gas or both the primary anode outlet gas and the primary cathode outlet gas perform a second cell flow pass, and whereby the at least one primary cell has anode gas flow in a first direction and cathode gas flow in a second substantially opposite direction relative to the anode gas flow direction such that said primary cell internally has counter-flow and said at least one secondary cell has anode gas flow in said second direction and cathode gas flow in said second direction such that said at least one secondary cell internally has Co-flow ("H").

2. A cell stack, comprising a plurality of fuel cells or electrolysis cells arranged in layers on top of each other, each of said cells comprising an anode an electrolyte and a cathode, each layer of cells is divided by a plurality of interconnects, one between each cell, the interconnects are provided with gas channels on each side facing the anode or cathode side of the adjacent cell, the gas channels run from an inlet portion to an outlet portion of said cells, the substantial direction from the anode inlet portion to the anode outlet portion of the anode side of each cell defines the anode gas flow direction of each cell and the substantial direction from the cathode inlet portion to the cathode outlet portion of the cathode side of each cell defines the cathode gas flow direction of each cell, each cell in the stack has one of:

internal co-flow of the anode gas flow direction relative to the cathode gas flow direction or, internal cross-flow of the anode gas flow direction relative to the cathode gas flow direction or, internal counter-flow of the anode gas flow direction relative to the cathode gas flow direction the interfacing sides of adjacent cells on each side of an interconnect are oriented in either of:

interconnect co-flow interconnect cross-flow interconnect counter-flow, wherein the stacked cells are arranged such that each individual cell and adjacent cells have a combination of said internal co-flow, internal cross-flow or internal counter-flow of the anode gas direction relative to the cathode gas flow direction internally in each individual cell and have a combination of said interconnect co-flow, interconnect cross-flow or interconnect counter-flow between two interfacing sides of adjacent cells, said stack comprising at least one set of primary cells and adjacent secondary cells, wherein the anode outlet gas of at least one primary cell is redistributed to the anode inlet portion of at least one secondary cell, whereby the primary anode outlet gas performs a second cell flow pass, wherein the anode outlet gas of all primary cells is collected, mixed and redistributed to the anode inlet gas portion of all secondary cells, or the cathode outlet gas of all primary cells is collected, mixed and redistributed to the cathode inlet gas portion of all secondary cells, or both the anode outlet gas of all primary cells is collected, mixed and redistributed to the anode inlet gas portions of all secondary cells and the cathode outlet gas of all primary cells is collected, mixed and redistributed to the cathode inlet gas portion of all secondary cells, whereby the primary anode outlet gas or the primary cathode outlet gas or both the primary anode outlet gas and the primary cathode outlet gas perform a second cell flow pass, and wherein the anode outlet gas of at least two primary cells is merged into one primary anode outlet gas flow and directed to the anode inlet portion of at least one secondary cell, whereby the primary anode outlet gas performs a second flow pass through said secondary cell and the at least two primary cells have anode gas flow in a first direction and cathode gas flow in a second direction substantially opposite to said first direction such that said primary cells internally have counter-flow and said at least one secondary cell has anode gas flow in said second direction and cathode gas flow in said second direction such that said at least one secondary cell internally has co-flow ("J").

3. A cell stack according to claim 2, wherein said cells are Solid Oxide Fuel Cells.

4. A cell stack according to claim 2, wherein said cells are Solid Oxide Electrolysis Cells.

5. A cell stack according to claim 1, wherein said cells are Solid Oxide Fuel Cells.

6. A cell stack according to claim 1, wherein said cells are Solid Oxide Electrolysis Cells.

* * * * *